Figure 1:
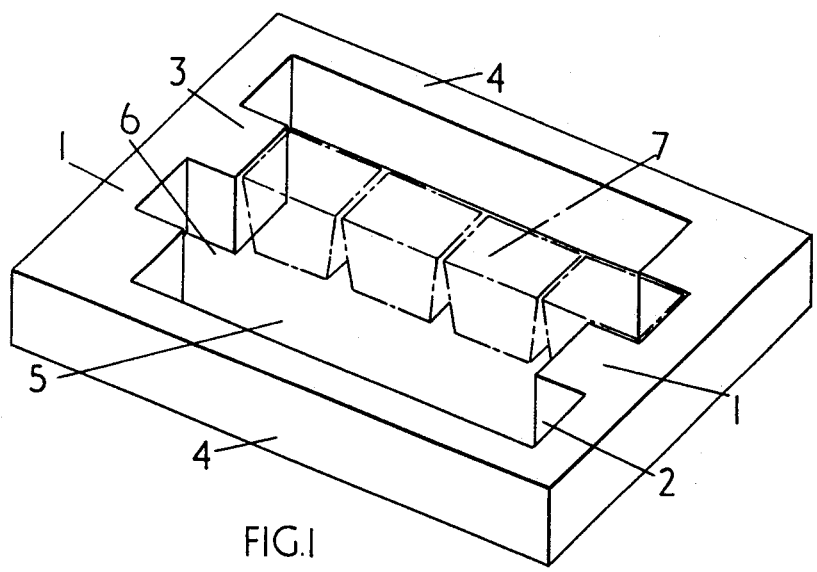

United States Patent [19]
Dugan-Chapman

[11] 3,818,634
[45] June 25, 1974

[54] TRAY
[75] Inventor: Charles Dugan-Chapman, London, England
[73] Assignee: Stewart Plastics Limited, Croydon, England
[22] Filed: Aug. 9, 1972
[21] Appl. No.: 279,010

[30] Foreign Application Priority Data
Aug. 9, 1971 Great Britain.................... 37380/71

[52] U.S. Cl. ........................... 47/34.13, 206/46 PL
[51] Int. Cl. ............................................. A01g 9/02
[58] Field of Search ....... 47/34.11, 34.13; 220/23.4, 220/23.8, 20; 206/56 AB, 46 PL

[56] References Cited
UNITED STATES PATENTS
| | | | |
|---|---|---|---|
| 142,952 | 9/1873 | Simmons...................... | 47/34.13 X |
| 396,784 | 1/1889 | Vaughan........................... | 47/34.13 |
| 2,870,575 | 1/1959 | Weber............................... | 47/34.13 |
| 3,018,205 | 1/1962 | Barut............................. | 47/34.13 X |

FOREIGN PATENTS OR APPLICATIONS
| | | | |
|---|---|---|---|
| 22,466 | 9/1910 | Great Britain..................... | 47/34.13 |
| 1,179,807 | 8/1968 | Great Britain..................... | 47/34.13 |

Primary Examiner—Robert E. Pulfrey
Assistant Examiner—R. T. Rader
Attorney, Agent, or Firm—Learman & McCulloch

[57] ABSTRACT

A tray for holding an array of containers such as plant pots has alternating projections and recesses or gaps defining a pair of opposed walls so that alternate rows of the containers are relatively staggered to give a quincunx pattern. Preferably said sides have a zig-zag shape in plan view dimensioned so like trays will interlock.

6 Claims, 3 Drawing Figures

TRAY

This invention relates to trays, and particularly to trays suitable for containing a plurality of smaller, uniformly sized containers such as plant pots.

The invention will be described hereinafter with particular reference to the practice of cultivating plants in individual plant pots, for example in a greenhouse. One purpose of this practice is to protect the growing plants from pests, climate, etc. and to help attain a size at which they may be safely bedded out in the ground, when the pots are carried from the greenhouse and the plants removed and transferred to the bed. This frequently involves the transportation of large numbers of pots, and it is therefore desirable to load them on to trays to facilitate their handling.

Further, the packing of plant pots containing cultivated plants into trays is time consuming and frequently results in damage to the plants. It is commonly the practice, therefore, to load the plant pots on to trays before cultivation, thus reducing the amount of handling necessary in transporting the cultivated plants. This usually means that the pots are packed in rectangular array. This is undesirable, because it results in a low illumination efficiency. As the area of the foilage of each individual plant increases, adjacent plants come into contact and further growth is limited. Thus each plant defines the corner of a square, the centre of which will be devoid of foilage, and light falling on the centre of the square will not be utilised by the plants. In addition, where the plants are illuminated obliquely, for example by the sun, especially in early spring, plants closer to the source of illumination will tend to overshadow those further away.

Thus, it is desirable that, during cultivation, the rows of plant pots be staggered such that successive rows of pots are displaced alternately to the right and left of preceding rows, preferably by half the width of the pot. In this way, the unusable area of illumination between the plants is considerably reduced, resulting in increased growth. Additional advantages are that, if the plant pot is circular in cross-section, the pots can be packed closer together, while if the pots are not circular, for example, if they are elliptical or square in cross-section, each plant is further away from the nearest plants in adjacent rows, allowing them more room for growth.

Accordingly, it is an object of the present invention to provide a means whereby a plurality of plant pots may be constrained in a staggered array and in a readily transportable form.

When, as will frequently be the case, large numbers of plants are to be cultivated, it is desirable to arrange the pots into smaller groups of easily manageable size, for example ten to twenty pots per group. However, to obtain the full benefit of the invention, it is desirable that it should be possible to place the groups of plant pots adjacent to each other and with very little space between adjacent pots of successive groups, and without substantially interrupting the staggered arrangement of the rows of pots. Thus, a further object of the invention is to provide a tray suitable for restraining a plurality of pots in staggered array, and so proportioned that the staggered array of one tray may interlock with that of a similar tray placed adjacent thereto.

Accordingly, the invention consists in a tray comprising a generally rectangular base and side walls upstanding therefrom, including two opposed side walls each associated with one or more inwardly facing abutments, each abutment in each of said walls being situated adjacent an aperture in said wall, each aperture in one wall being situated directly opposite an abutment of said opposed wall.

The dimensions of a tray in accordance with the present invention will be related generally to the dimensions of the staggered array of similarly sized containers that it is desired to constrain, and to the dimensions of the individual containers of that array. Thus, the length of the side walls associated with the abutments will be substantially equal to the depth of the stack, while the aperture is so dimensioned that it will accommodate sufficient of a container that the plane of the abutment adjacent the aperture will pass substantially through the centre of a container therein accommodated.

This can be effected, when the container has a varying breadth, for example when it is circular in cross-section, if the width of the aperture is less than the largest breadth, but more than the smallest breadth of the container. If, on the other hand, the container to be constrained in staggered array has a constant breadth, for example when it is square in cross-section, the aperture should be at least as wide as that breadth, and provided with suitable stop means to limit the travel of the container through the aperture. In the latter case, it would be possible, in accordance with the invention, so to arrange the stop means of the aperture, in relation to the abutment adjacent the aperture, that a whole number of containers could be accommodated in the aperture between the stop means and a container having its centre substantially in the plane of the abutment. However, it is preferred that the container accommodated by the aperture with its centre substantially in the plane of the adjacent abutment should itself abut the stop means.

In a preferred embodiment of the invention, the construction of the tray is such that the staggered arrays of containers constrained by two or more such trays will interlock when the loaded trays are placed end to end.

Thus, in the case of a tray suitable for constraining a staggered array of plant pots of circular cross-section, in which the apertures in the side walls are less wide than the diameter of the pot, a portion of the pot will protrude through the aperture and provide a projecting surface to the outside face of one side wall which will be mirrored in the opposite side wall. It will therefore be possible to place two trays end to end when the projections due to the plant pots will interlock, thereby forming a continuous staggered array of pots.

When the walls of the tray are provided with apertures which are at least as wide as the breadth of the pot a plurality of which are to be constrained, and with suitable stop means to limit the travel of the pot through the aperture, the aperture preferably takes the form of a columnar recess in the side wall, the inner face of which recess constitute stop means. The unrecessed portions of the side wall may then conveniently constitute the abutments. In this case, by constructing trays such that each columnar recess in the side wall corresponds with a columnar projection of the outside face of the side wall, and the breadth of each projection is not greater than the distance between each projection, two trays may be placed end to end such that the columnar projections of their side walls interlock, so that, when loaded with plant pots, a substantially continuous staggered array of pots will be obtained.

It is preferred that a tray constructed in accordance with the invention to interlock with a similar tray, be constructed to accommodate an even number of rows of pots. When this is the case, the tray possesses radial symmetry and the ability of two such trays to interlock will not be affected by rotating one of the trays through 180°.

It is further desirable that the tray be constructed with its ascending side walls sloping outwardly from the floor. This has the double advantage that, most plant pots in use at the present time having a frusto-conical or frusto-pyramidal form, the array of pots is stabilised since a side of each outside pot is supported against the inner surface of the wall, and two similar trays will nest one within the other for easy storage when not in use.

The invention will be further described with reference to the accompanying drawings.

In the drawings, FIG. 1 shows a tray which can accommodate sixteen pots of square cross-section in four rows, the tray comprising two opposed side walls 1, each wall having two apertures 2 separated by inwardly facing abutments 3, each aperture 2 in one wall being situated directly opposite an abutment 3 of the opposed wall. The tray further comprises a pair of unrecessed opposed walls 4 and a floor 5 which extends by means of four tongues 6 into each aperture 2. Each aperture 2 takes the form of a recess in the wall, the recess being of sufficient width and depth to accommodate one-half of a pot 7 such that succeeding rows of pots are alternately staggered to the left and right by a distance equal to half the length of the pot.

Figure 2:
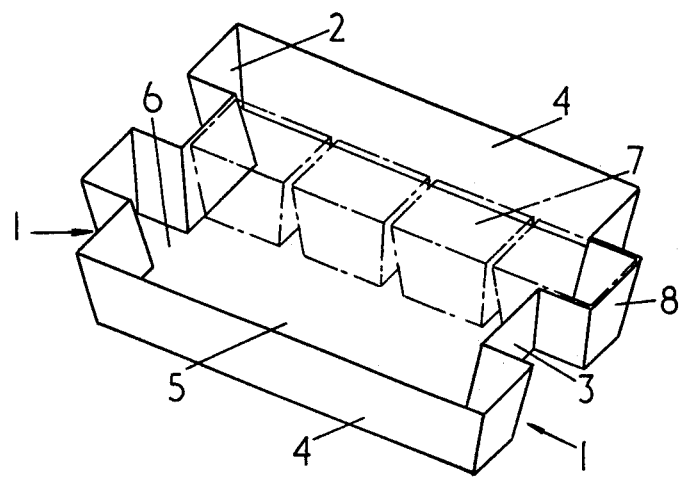

FIG. 2 illustrates a modification of the tray in FIG. 1 which will interlock with and also nest within a similarly constructed tray. As in FIG. 1, the tray comprises two opposed walls 1 each of which contains two apertures 2 separated by inwardly facing abutments 3, two unrecessed opposed walls 4 and a floor 5 extending through the apertures 2 by means of tongues 6. In addition, the walls 1 bear on their outer surface projections 8 corresponding with the apertures 2 of the inner surface. The tray is so constructed that the breadth of each projection 8 is less than the distance between each adjacent aperture, enabling the corresponding projections of similar trays to interlock when the trays are placed end to end.

Figure 3:
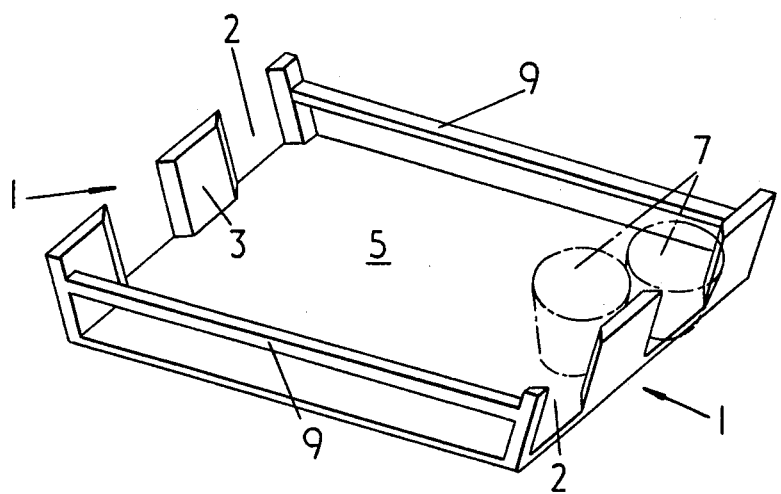

FIG. 3 illustrates a further tray in accordance with the invention suitable for constraining a staggered array of plant pots of circular cross-section. The two opposed walls 1 are each divided by apertures 2, which apertures are separated by portions of the wall 3 constituting inwardly facing abutments. In the drawing, these abutments are inclined at an obtuse angle to the floor 5 to offer more support to the plant pots 7. The plant pots 7 are of frusto-conical form, that is of circular cross-section and the breadth of the apertures 2 is insufficient to allow complete passage of a plant pot therethrough. Accordingly, the pot is held with a part of its surface protruding through the aperture thereby forming a projection to the outer surface of the wall 1, enabling a similarly loaded tray to be placed end to end with the partly protruding plant pots interlocking. Restraining rails 9 constitute the remaining side walls of the tray.

An alternative embodiment of the invention, suitable for constraining a staggered array of pots of circular cross-section, and capable of interlocking with a similar tray, is a modification of FIG. 2 wherein the recesses 2 are semi-hexagonal in section and the abutment 3 has a width not less than the side of the hexagon.

The trays described herein may suitably be manufactured from rigid plastics material, for example high impact polystyrene. The trays may be strengthened by providing the underside of the floor with longitudinal ribs, or by providing recessed channels in the floor, each serving also to support the tray, and the floor may conveniently be perforated to permit drainage, and/or ventilation of the contents.

I claim:

1. A tray of the kind suitable for containing a plurality of regularly sized containers, the tray comprising: a generally rectangular base having side portions and a plurality of opposed side walls upstanding from said side portions for containing said containers such that each of said containers is held substantially laterally immovable with respect to other of said containers; two opposed of said side walls being each formed with at least one abutment portion, and a pair of recessed portions, on opposite sides of said abutment portion, defining a pair of recesses adjoining opposite sides of said abutment portion for receiving at least parts of a pair of containers contained within the tray, said recessed and abutment portions being so dimensioned that said pair of containers contained within the tray may pass partly, but not completely, into said recesses provided by the recessed portions of one of said two opposed side walls, while another of said containers contained within the tray may abut said pair of containers and a respective abutment portion adjacent the said recessed portions in said one side wall to dispose an outermost side surface of said another container in a plane parallel to said two opposed side walls and passing substantially through the centers of the said pair of containers, said recessed and abutment portions being so dimensioned that said pair of containers within said recesses form projections of predetermined breadth externally of the respective tray wall abutment portion with adjacent projections of the same side wall being spaced apart by a distance not less than the breadth of said projections.

2. An assembly comprising: a tray having a generally rectangular base with side portions and a plurality of opposed side walls upstanding from the side portions of said base; and a plurality of uniformly sized containers contained within said tray, each of said containers having side surfaces and being held substantially laterally immovable with respect to other of the said containers, said containers being arranged in at least two co-adjacent files extending between two opposed of the said side walls and parallel to the other two of the said side walls, the containers in each file being contiguous with the adjacent containers in the file, said two opposed side walls being each formed with at least one abutment portion and an adjoining recessed portion on either side of said abutment portion, said recessed portions of one of the said two opposed walls accommodating parts of a first pair of containers at one end of a first pair of alternate files, a respective abutment portion adjoining each recessed portion abutting a second container of a second file disposed inwardly of the end of said first pair of files, such that an outer side surface of said second container lies in a plane parallel to the two opposed side walls and passing substantially through the center of said first pair of containers of the said first pair of files, and wherein the assembly of containers is provided with lateral projections along each of the said two opposed side walls at the said recessed portions, the projections along each of the said walls having a predetermined breadth and being spaced apart by a distance not less than the breadth of each projection, whereby the assembly and a second similar assembly may be juxtaposed with respective projections interlocking.

3. An assembly according to claim 2, wherein each recessed portion of the said two opposed side walls constitutes a lateral projection of the said assembly.

4. An assembly according to claim 3 wherein each recessed portion of the said two opposed side walls includes an aperture through which a part of each respective leading container protrudes from the respective wall externally of the tray to constitute thereby the said lateral projections of the assembly.

5. In combination: a tray having a base, a pair of upstanding side walls and a pair of opposed upstanding end walls; and a plurality of longitudinally extending, co-adjacent rows of contiguous containers contained within said tray and extending between said end walls; each end wall including a container abutment portion for abuting a container at one end of one of said rows, and an adjoining aperture through which part of a container at one end of the co-adjacent row protrudes externally of said abutment portion so that two co-adjacent rows are not longitudinally coextensive, the aperture and abutment portion in one end wall being longitudinally aligned with an abutment portion and aperture respectively of the opposed end wall; said end walls being configured and said apertures and said abutment portions being dimensioned to dispose the protruding parts of said end containers in laterally interfitting and longitudinally overlapping relation with the container parts that protrude externally of an opposite corresponding end wall abutment portion of a similar tray.

6. The combination as set forth in claim 5 wherein said end walls include recessed portions adjoining said abutment portions constituting lateral projections which receive the protruding container parts, said recessed and abutment portions being so configured and dimensioned to dispose the recessed portions of one end wall in laterally interfitting and longitudinally overlapping relation with the lateral projections of the opposite end wall of a similar tray.

* * * * *